(12) United States Patent
Powar

(10) Patent No.: US 7,028,008 B2
(45) Date of Patent: *Apr. 11, 2006

(54) METHOD AND APPARATUS FOR PAYING BILLS ELECTRONICALLY USING MACHINE READABLE INFORMATION FROM AN INVOICE

(75) Inventor: William L. Powar, Palo Alto, CA (US)

(73) Assignee: Visa International Service Association, Foster City, CA (US)

( * ) Notice: Subject to any disclaimer, the term of this patent is extended or adjusted under 35 U.S.C. 154(b) by 652 days.

This patent is subject to a terminal disclaimer.

(21) Appl. No.: 10/176,449

(22) Filed: Jun. 20, 2002

(65) Prior Publication Data

US 2002/0161704 A1 Oct. 31, 2002

Related U.S. Application Data

(63) Continuation of application No. 08/521,623, filed on Aug. 31, 1995, now Pat. No. 6,438,527, which is a continuation-in-part of application No. 08/146,515, filed on Nov. 1, 1993, now Pat. No. 5,465,206.

(51) Int. Cl.
*G06F 17/00* (2006.01)
(52) U.S. Cl. ....................................... 705/40
(58) Field of Classification Search ................. 705/40, 705/34, 35, 39, 76; 714/700
See application file for complete search history.

(56) References Cited

U.S. PATENT DOCUMENTS

| | | | |
|---|---|---|---|
| 4,270,042 A | 5/1981 | Case | |
| 4,823,264 A | 4/1989 | Deming | |
| 4,947,028 A | 8/1990 | Gorong | |
| 5,093,787 A | 3/1992 | Simmons | |
| 5,220,501 A | 6/1993 | Lawlor et al. | |
| 5,265,008 A | 11/1993 | Benton et al. | |
| 5,283,829 A | 2/1994 | Anderson | |
| 5,324,922 A | 6/1994 | Roberts | |
| 5,326,959 A | 7/1994 | Perazza | |
| 5,362,948 A | 11/1994 | Morimoto | |
| 5,444,616 A | 8/1995 | Nair et al. | |
| 5,465,206 A | 11/1995 | Hilt et al. | |
| 5,465,291 A | 11/1995 | Barrvs et al. | |
| 5,496,991 A | 3/1996 | Delfer, III et al. | |
| 5,920,847 A | 7/1999 | Kolling et al. | |
| 6,285,991 B1 * | 9/2001 | Powar | 705/76 |

(Continued)

FOREIGN PATENT DOCUMENTS

JP 02000113089 A 4/2000

(Continued)

OTHER PUBLICATIONS

Kolling, R. et al Derwent-ACC-No: 1999-404059.*

(Continued)

*Primary Examiner*—Elisca Pierre Eddy
(74) *Attorney, Agent, or Firm*—Beyer Weaver & Thomas LLP

(57) ABSTRACT

Data capture which occurs at the consumer end of an electronic bill pay transaction is assisted by machine readable information in a standardized format on an invoice where the machine readable information includes biller identification and a C-B account number and the information is readable at the consumer end without prior arrangements being made specifically between the consumer and the biller. The biller identification is either a universal biller reference number or sufficient information to allow manual identification and contact with the biller. The machine readable information is an optically-readable bar code, characters in a font designed for error-free character recognition by optical or magnetic means.

20 Claims, 5 Drawing Sheets

U.S. PATENT DOCUMENTS 6,438,527 B1 * 8/2002 Powar .......................... 705/40

FOREIGN PATENT DOCUMENTS

JP            02000113089 A  *  4/2000

OTHER PUBLICATIONS

Michael P. Sullivan; Home Banking—The Ultimate Delivery System; The Bankers Magazine; pp. 40-42.
George C. White; The Reality—EFTS Is Here and Many Banks Are Missing It; United States Banker; pp. 48-49.
David O. Tyson; Banks in Denver, San Francisco to *Offer Customers* PC Links; Oct. 23, 1985.
Dale L. Reistard; The Prospects for ATM Program Changes Due to Debit Card, Chip Card and Home Terminal Development; Notes from ATM/3, BAI's Third National ATM Conference, New Orleans, LA; Nov. 16-19, 1980 pp. 144-146.
John F. Fisher; In-Home Banking Today and Tomorrow; Journal of Retail Banking; Jun. 1, 1982 pp. 23-30 vol. IV/2.
Debbie Guthrie Haer; Two-way cable TV to provide home banking in Omaha; Bank News; Feb. 15, 1982 pp. 9-10, 12 and 15.
R. Trigaux; Home Banking Reaches Critical Juncture; American Banker; Oct. 19, 1982 vol. 147/204.
John A. Farnsworth; Home Banking—Part of a Bigger Picture; United States Banker; Jun. 1983.
Michael P. Sullivan; The HBI Role in the Home Banking Revolution; United States Banker; pp.. 46-48.
Home Banking Interchange Offers More Than Just Credits and Debits; American Banker; Jul. 6, 1983 vol. 148/130.
D. Tyson; Home Banking Interchange Is Going Through Final Tests; American Banker; Jun. 18, 1984 vol. 149/120.
Robert M. Garsson; NBD Offers Electronic Highway for Network of Shared ATMs; American Banker; Apr. 11, 1984.
David Jones; US Banks Experiment With Home Banking; The Banker; Jan. 1984 pp. 61-67.
Electronic Home Banking Lets Customers Pay Bills Around The Clock; Bank Administration; Apr. 1984.
A. Joseph Newman, Jr.; 8 Banks and Thrifts in 3 States Launch Video Banking Service; American Banker,; Jun. 9, 1987 pp. 2 vol. 152/111.
Maria Osborn Howard; Crestar to test at-home banking; Richmond Times-Dispatch; Feb. 26, 1994 pp. C 1 and C6.
Lisa Fickenscher; Online Resources' Home Banlting Patent Hits Hot Buttons Throughout Industry; American Banker; Feb. 17, 1994.
Patrick T. King; A Novel Television Add-On Data Communication System; Journal of the SMPTE, vol. 83; Jan. 1974 pp. 10-13.
Tekla S. Perry; Electronic banking goes to market; IEEE Spectrum; Feb. 1988 pp. 46-49 vol. IEEE.
Next in banking: pay bills by phone; Business Week; Nov. 13, 1965.
Allan H. Anderson et al. (8 more authors); An Electronic Cash and Credit System; ; 1966 pp. pp. 19-87 vol. Lib/ Congress 66-27016 American Management Association, Inc.
Money goes electronic in the 1970s Special Report; Business Week; Jan. 13, 1968 pp. pp. 54-76.

EFT Technology—Present and Future; Transcript of National Commission On Electronic Fund Transfers Suppliers Committee Public Hearings; Dec. 16, 1976.
D Tyson; Home Banking: Programs In Operation In 1984 and Planned; American. Banker; May 14, 1984 pp. 22-23 vol. 149/95.
Chris Shipley; With CheckFree, PCs pay bills, so . . . "I threw away my checkbook"; PC Computing; Nov. 1990 vol. Ziff-Davis Publishing Company.
Vicki J Hall; Home Banking in the '90s: Successful Business Strategies; Submitted in partial fulfillment of the requirements of the Pacific Coast Banking School conducted at the University of Washington, Seattle; Apr. 1990 pp. 1-90.
Rhea Dawson; Knoxville bank's TV banking appeals to upper-income consumers; Bank Systems & Equipment; Jul. 1981 pp. 47-49.
Joan Prevete Hyman; Switch software to take on POS, home banking functions; Bank Systems & Equipment; Feb. 1983 pp. 68-70.
Derwent-ACC-No: 1999-404059, Kolling, R. et al.
"U.S. Orders Assembles A ScanFone Dream Team", Bank Network News, vol. 11, No. 24.
Money Circulation System, Nickkei Data-Pro, KS3-210-203 (Money Circulation Network), item II, Online Fund System among Main Bank, Oct. 1, 1989.
Electronic Banking, Money Circulation Data System Center, Oct. 31, 1986, pp. 35-41.
Chapter 10: Electronic Funds Transfer and the Intelligent Token; Security for Computer Networks: An Introduction to Data Security in Teleprocessing and Electronic Funds Transfer; D.W. Davies and W.L. Price; John Wiley & Sons; 1984.
Verkoren, Hans, "Eurogiro: Transparency in Cross-Border Payments," Eurogiro Network, Winter, 1995, pp. 28-30.
"Electronic Consumer Billing and Payment: Architecture" relating to the "Electronic Consumer Invoice and Payment," project in TG6 WG3 of the Finance Sub-Committee of ASC X12.
"Consumer Bill Payment Services," relating to the "Electronic Consumer Invoice and Payment," project in TG6 WG3 of the Finance Sub-Committee of ASC X12.
White, George C. Jr., "The Developing Electronic Giro Payment Environment," Bank Marketing, Apr., 1978, pp. 1-5.
Home Banlang Interchange; Revolving Credit Letter; May 27, 1983.
Home Banldng Interchange Offers More Than Just Credits and Debits; American Banker; Jul. 6, 1983 vol. 148/130.
Next in banking; pay bills by phone; Business Week; Nov. 13, 1965.
Base I: A Real-Time System For Interchange Authorization; 1973 vol. Visa USA Inc.
Base II: An Electronic System for Worldwide Interchange; 1976 vol. Visa International.
Chris Shipley; With CheckFree, PCs pay bills, so . . . "I threw away my checkbook"; PC Computing; Nov. 1990 vol. Ziff-Davis Publishing Company.
Paul J. Mila; Home Banking/Bill Paying Still Has Not Taken Off;; Vol. Online Resources.
Presented by Dennis J. Pope, Manufacturers Hanover Trust, New York, NY.

* cited by examiner

Bill to

Biller B Goods/Services

Consumer C
123 Main Street
Town, State 00000

257 Second Street
City, State 00000
(###) ###-####

C - B  acct  #  12345-678

BRN  901-234-567

Amount Due:  $25.97

Due Date:  01/02/95

METHOD AND APPARATUS FOR PAYING BILLS ELECTRONICALLY USING MACHINE READABLE INFORMATION FROM AN INVOICE

This application is a continuation of application Ser. No. 08/521,623, filed Aug. 31, 1995 now U.S. Pat. No. 6,438,527, which is a continuation-in-part of application Ser. No. 08/146,515, filed Nov. 1, 1993, issued as U.S. Pat. No. 5,465,206 on Nov. 7, 1995.

BACKGROUND OF THE INVENTION

The present invention relates to the field of electronic bill payment systems ("bill pay") which allow a consumer to direct their bank, an agent of their bank, or a non-bank bill pay service bureau to pay amounts owed to merchants, service providers and other billers who bill consumers for amounts owed.

U.S. Pat. No. 5,465,206 issued to James J. Hilt et al. teaches a bill pay system in where each participating payee is assigned a biller reference number ("BRN"). That patent ("the Hilt Patent") is commonly owned by the assignee of the present application and is incorporated by reference herein for all purposes. In the Hilt bill pay system, a consumer could make a payment to a biller without any prior payment arrangements required between the consumer and the biller, so long as the consumer knew the biller's BRN and the consumer's account number with the biller (C-B account number). Various electronic bill payment data entry methods are disclosed in Hilt, such as entry over a telephone link using voice recognition or using the keys of the telephone, or entry into a personal computer program which eventually transmits the bill payment instructions to the consumer's bank or the bank's agent.

In other prior art systems, a biller creates an invoice which includes a remittance stub and sends the invoice with a request that the consumer return the remittance stub with the consumer's check in payment of the invoice ("white mail"). Because billers can rely on receiving the remittance stubs back, billers will typically encode each remittance stub to assist with automatic data entry of billing information into an electronic billing system once the remittance stub and check are received. Thus, if the consumer returns the remittance stub, the biller does not have to rely on the consumer to correctly indicate the C-B account number. This system has worked well where billers actually do receive the remittance stub. However, in an electronic bill pay system, paper documents do not generally change hands.

Because paper documents do not change hands, billers must rely on the consumer for data capture of information from the invoice, which is generally less reliable than electronic (e.g., optically scanned) data capture from remittance stubs at the biller's site. In addition, where a consumer enters a C-B account number manually, the biller must still perform manual data entry.

One solution in the prior art for ensuring correct data entry by a consumer is the pick list. With a pick list, the consumer submits a list of payees with a BRN and a C-B account number for each payee. Of course, if the Hilt system is not used, more information than the BRN is required, such as the biller name, address' telephone number, etc. The list of payees is then verified by the consumer's bank to ensure that the correct billers have been identified and that the C-B account numbers listed by the consumer are the account numbers for that consumer. Once this is done, the consumer is supplied with a pick list of billers. If the billers on the pick list are numbered, the consumer then need only enter the pick list entry number in lieu of data capture of the biller identification and C-B account number. The pick list is either a paper document, as might be used for telephone data entry systems, or an electronic document, as might be used for personal computer based bill payment systems.

The problem with this approach is that the ability to connect a particular consumer with a particular biller without any prior connection is lost, since the consumer must have had the biller previously verified and placed on the pick list. Thus, a consumer cannot decide to pay a new biller and make a payment without the intervening delay for verification.

The pick list approach is also undesirable because C-B account numbers can change without any awareness of the consumer. For example, in the utility industry, C-B account numbers encode for a meter reading route. The meter reading routes are periodically updated, as routes are optimized and as new housing and commercial developments arise to alter the optimization of routes and route distribution. Typically, a meter reading route for a given C-B account changes once each five years. If pick lists are used, or the consumer relies on other means of prestoring the C-B account number, the transaction will be in error once each five years. While this is not a problem for an individual error, if the error costs $25 to fix between the consumer's time, the biller's time and any customer service time and expense, the average cost per transaction is about 41 cents since the error will occur in one out of each sixty transactions (assuming monthly billing).

U.S. Pat. No. 5,283,829 (issued to Anderson) discloses a bill payment system where a bill is printed with an approval code. The approval code includes error coding and maps to the C-B account number and the particular bill (i.e., it maps to a particular month if the bills are monthly). The mapping from the approval code to the C-B account number and the month are provided by a table maintained by the biller. While this system is useful for a single biller and where current bills are paid in full, it does not include a biller identifier and therefore is not useful for a global system. Furthermore, there is no provision for automatic data capture of the data provided. A consumer must enter the number as printed on the bill, and entry errors are expected, requiring the consumer to reenter the approval code.

Therefore, what is needed is an improved method and apparatus for correctly capturing data from an invoice including data specifying biller identification and a C-B account number.

SUMMARY OF THE INVENTION

An improved bill paying system is provided by virtue of the present invention.

In one embodiment of a bill pay system according to the present invention, participating consumers pay bills electronically to participating billers using a bill payment network (hereinafter "the payment network") and the data capture which occurs at the consumer end of the electronic transaction is assisted by machine readable information in a standardized format where the machine readable information includes biller identification and a C-B account number and the information is readable at the consumer end without prior arrangements being made specifically between the consumer and the biller. In a specific embodiment, the biller identification is supplied by a BRN such as that taught in the Hilt patent.

The machine readable information can be read from a biller's invoice in a number of ways, depending on how it is present on the invoice. For example, the biller could print the information using optically-readable an barcode, using a font designed for error-free optical character recognition, or using magnetically-readable characters (MICR). Alternatively, a magnetic strip could be provided on the invoice.

In another variation, the machine readable information includes a payment due date and an amount due.

The information from the invoice is read, in various embodiments, by a smart card, a specially adapted telephone, a personal computer, or the like. Regardless of the exact form of hardware, the hardware includes a means for reading the machine readable information. For example, if a smart card is used, the smart card would include a reading device.

If a smart card or other portable device, such as a "smart wallet", is used to capture the billing data, the portable device might be provided to an automatic teller machine ("ATM") for communication of billing instructions to the consumer's bank. A smart card or smart wallet would also serve the additional function of being a means to verify the authorization to issue bill payment instructions much like a credit card currently serves an authorization function. If the smart card or smart wallet also had built in communication capabilities, such as a modem and a telephone connection or a wireless modem, it would send payment instructions itself.

A further understanding of the nature and advantages of the inventions herein may be realized by reference to the remaining portions of the specification and the attached drawings.

BRIEF DESCRIPTION OF THE DRAWINGS

FIG. 3 is a schematic diagram of a printed bill used with the present invention.

DESCRIPTION OF THE PREFERRED EMBODIMENTS

Figure 1:
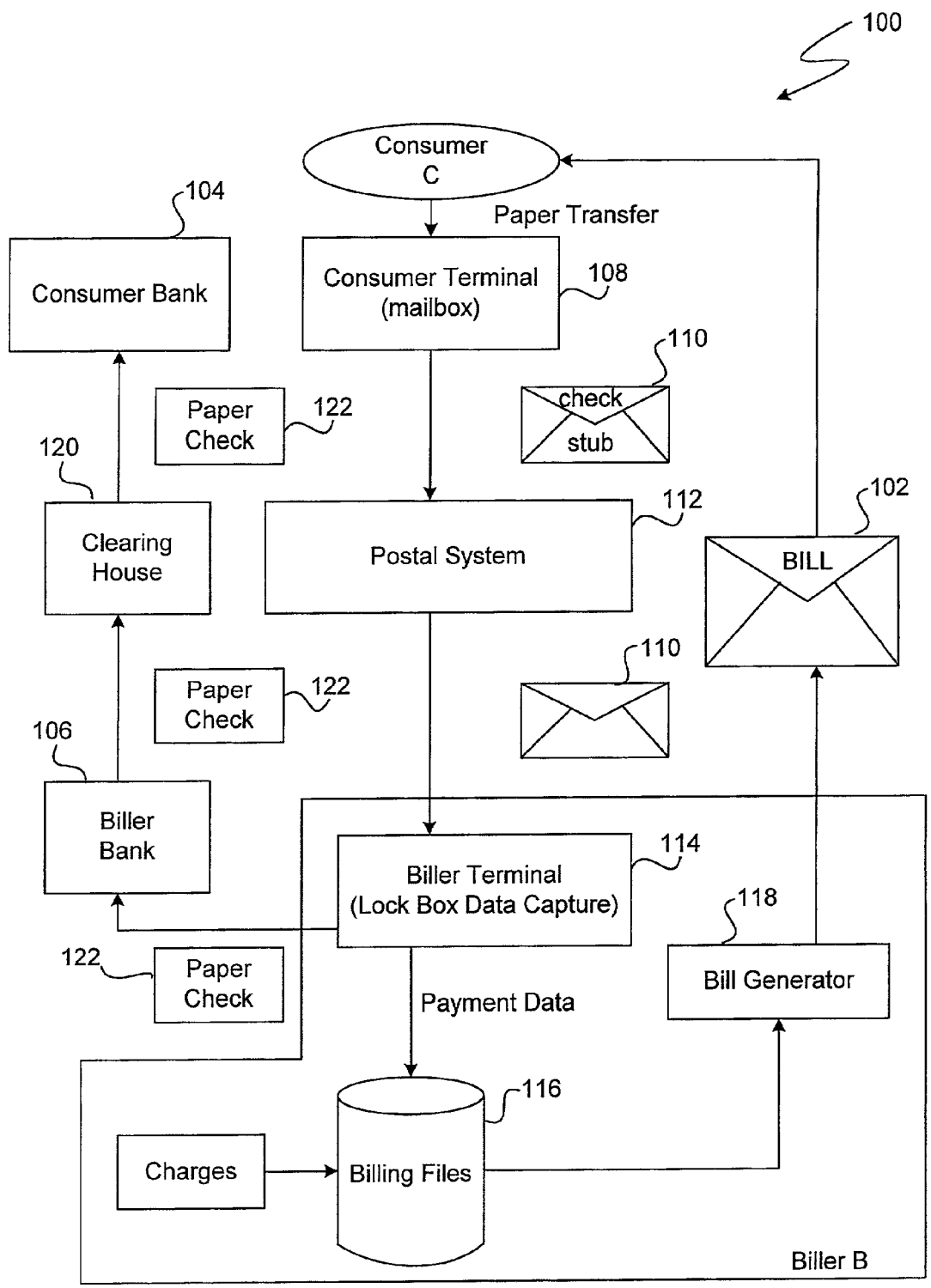
FIG. 1 is a block diagram of a prior art bill payment system with data capture at a biller terminal.

FIG. 1 shows a bill payment system 100 which is commonly used today to pay bills, where a consumer C pays a bill to a biller B when B sends a bill 102 to C. It should be understood that the term "consumer" is used here as an example of a bill payor, and the invention is not limited to use where the bill payor is a consumer. For example, the invention works equally well where the payor is a reseller. The actual payment of the bill occurs when a consumer bank (C bank) 104 transfers funds from an account maintained for C to a biller bank (B bank) 106, who then credits the funds to an account held for B. The other elements of system 100 are: a consumer terminal 108, which serves as the point of transit for a bill payment 110 into a postal system 112, a biller terminal 114, which is the destination of bill payment 110, a billing database 116 and a bill generator 118.

The bill payment process begins when biller B generates a bill for consumer C using billing database 116 and bill generator 118. The generated bill 102 is typically in the form of a printed invoice with a remittance stub. Bill 102 is sent to consumer C, who then encloses a check 122 drawn on the account at C bank with the remittance stub, and submits this bill payment 110 to biller B by post. Depending on biller B's instructions, the bill payment will go to either biller B or to an agent of biller B, such as a lockbox. When a bill payment is received, the necessary billing data is captured (payment amount, C-B account number, etc.) and check 122 is sent to B bank 106 for presentment, typically via a clearinghouse 120, to C bank 104.

The ability of biller terminal 114 to accurately capture billing data from the bill is generally the result of applying machine-readable encoding of the C-B account number onto the remittance stubs generated by bill generator 118. Since bill generator 118 and biller terminal 114 are both controlled by biller B, it is a simple matter to arrange for a readable encoding. Without the remittance stub, however, the bill payment becomes an exception item, which is many times more expensive to process than a bill payment with a remittance stub. With current electronic payment systems, it is assumed that the paper remittance stub is not presented to the biller.

Figure 2:
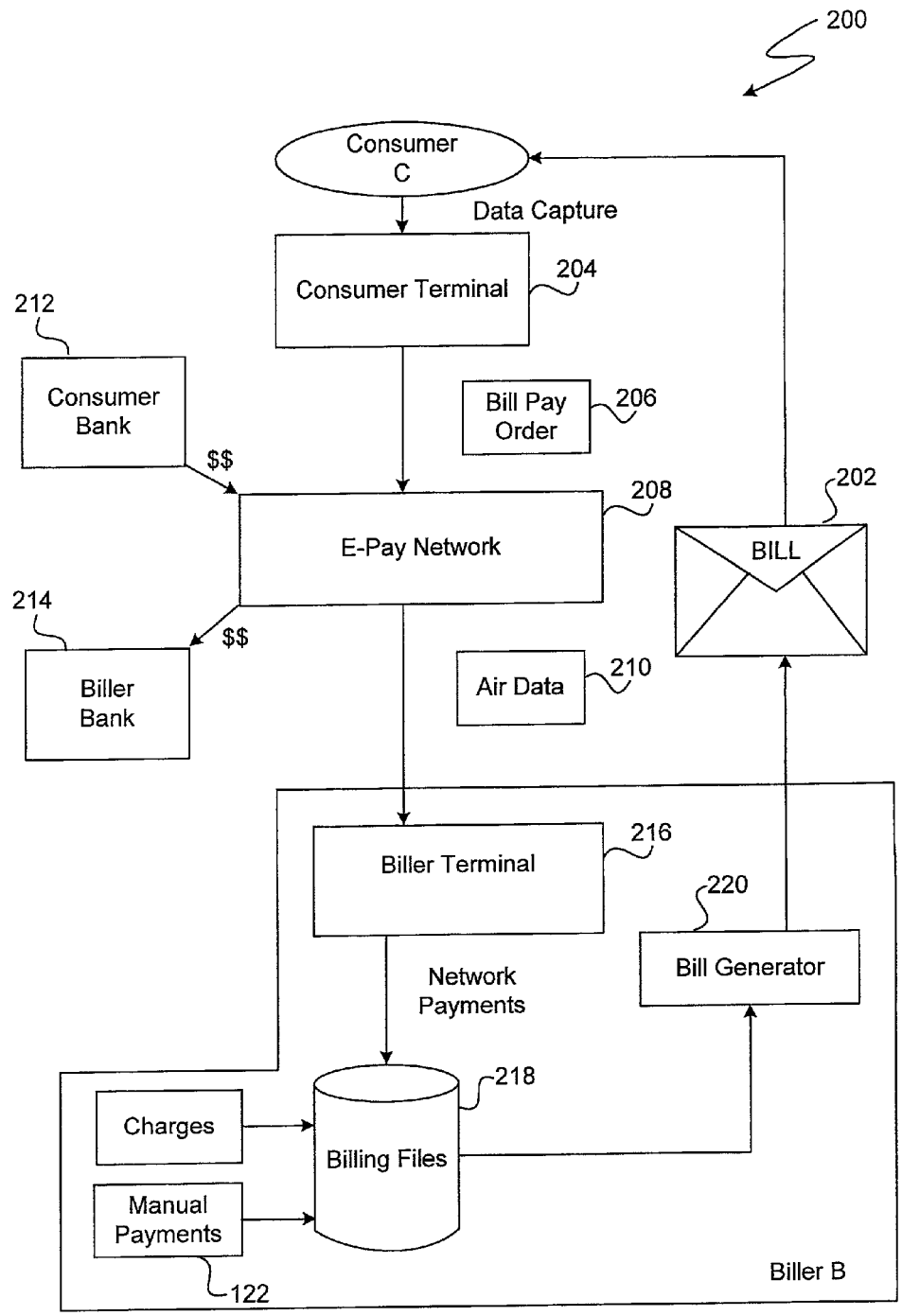
FIG. 2 is a block diagram of a bill payment system with data capture at a consumer terminal according to an embodiment of the present invention.

FIG. 2 shows an electronic bill pay system 200 where the remittance stub is not used. In system 200, biller B sends a bill 202 to consumer C. Consumer C uses a consumer terminal 204 to capture the data needed from bill 202 to generate a bill pay order 206. The data capture is a replacement for the prior art processes of addressing an envelope to the biller and including the remittance stub in the envelope, i.e., bill pay order 206 includes routing instructions to biller B and includes an indication of the C-B account number for the bill payment.

Bill pay order 206 is transmitted to an electronic payment network 208, which effects the transfer of funds from a consumer bank (C bank) 212 to a biller bank (B bank) 214, while providing accounts receivable (A/R) data 210 to a biller terminal 216, which reads the captured C-B account number from A/R data 210 and applies a credit to consumer C's account in billing database 218. Bills are generated by biller B using billing database 218 and bill generator 220. In order to provide backward compatibility, manual payments 222 can also be applied to billing database 218.

FIG. 3 is a schematic view of a remittance stub 300. Stub 300 is shown with an indication of consumer C, biller B, an amount owed and a due date. Some of this information might be encoded in a legacy encoding region 302, which is used by biller B when stub 300 is returned with a white mail payment. This legacy encoding region is generally only decodable by biller B, and in any case, no other entity has a use for it.

Stub 300 also includes a universal encoding region 304, which encodes data to be captured by consumer C which identifies biller B and the C-B account number. In the stub shown in FIG. 3, universal encoding region 304 also encodes for an amount due and a due date. Universal encoding region 304 might also include error correction and detection data 306. Because biller B generates bill 202, which includes stub 300, biller B is free to change the C-B account number as needed for its internal operations.

The above descriptions of FIGS. 2 and 3 describe the elements of a bill payment system in which data capture is performed by the consumer. FIG. 4 shows details of particular data capture means and FIG. 5 is a flow chart of a process for bill payment using the described system.

Figure 4A:
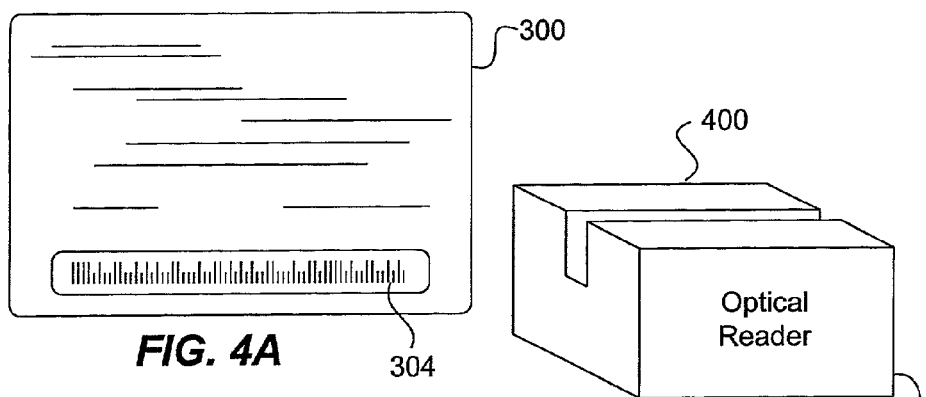
FIGS. 4(A), 4(B) and 4(C) show several embodiments of a data capture means.
Figure 4B:
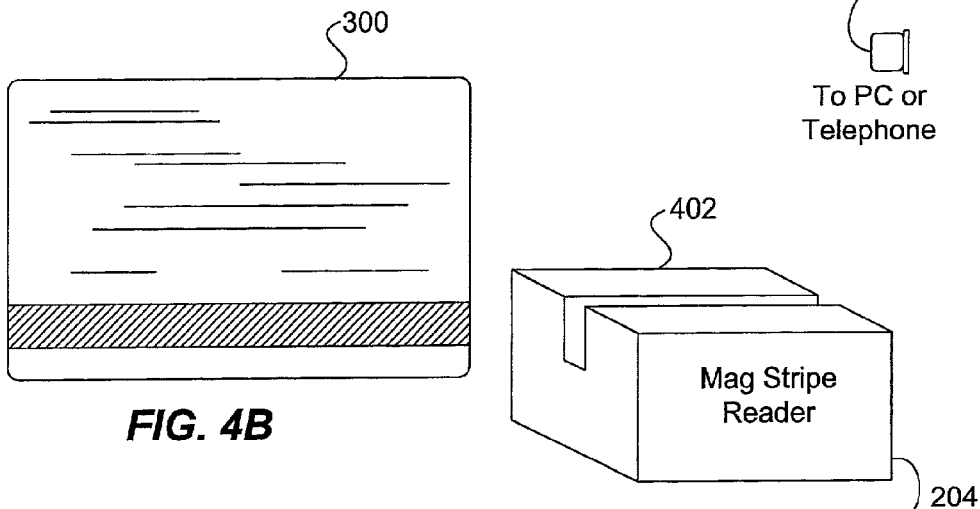

In FIG. 4, three embodiments of a universal data capture means are shown. FIG. 4(a) shows an optical reader 400 into which the consumer slides stub 300 for data capture. Alternatively, a hand-held reader, barcode wand, flatbed scanner or facsimile engine could be used. FIG. 4(b) shows a magnetic strip reader 402 which reads a magnetically encoded strip 404 on stub 300. Alternatively, strip 404 could be replaced with MICR encoded data. Whether optical reader 400 or magnetic strip reader 402 are used, the captured data is transmitted to consumer terminal 204 for validation. Preferably, consumer terminal 204 provides an indication of validity and prompts consumer C to rescan universal encoding region 304 if a scanning error occurred.

Figure 4C:
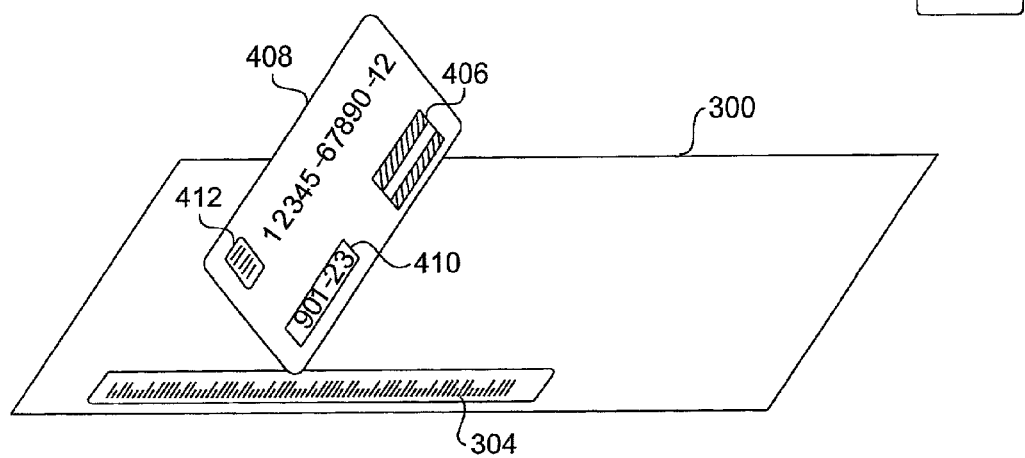
Figure 5:
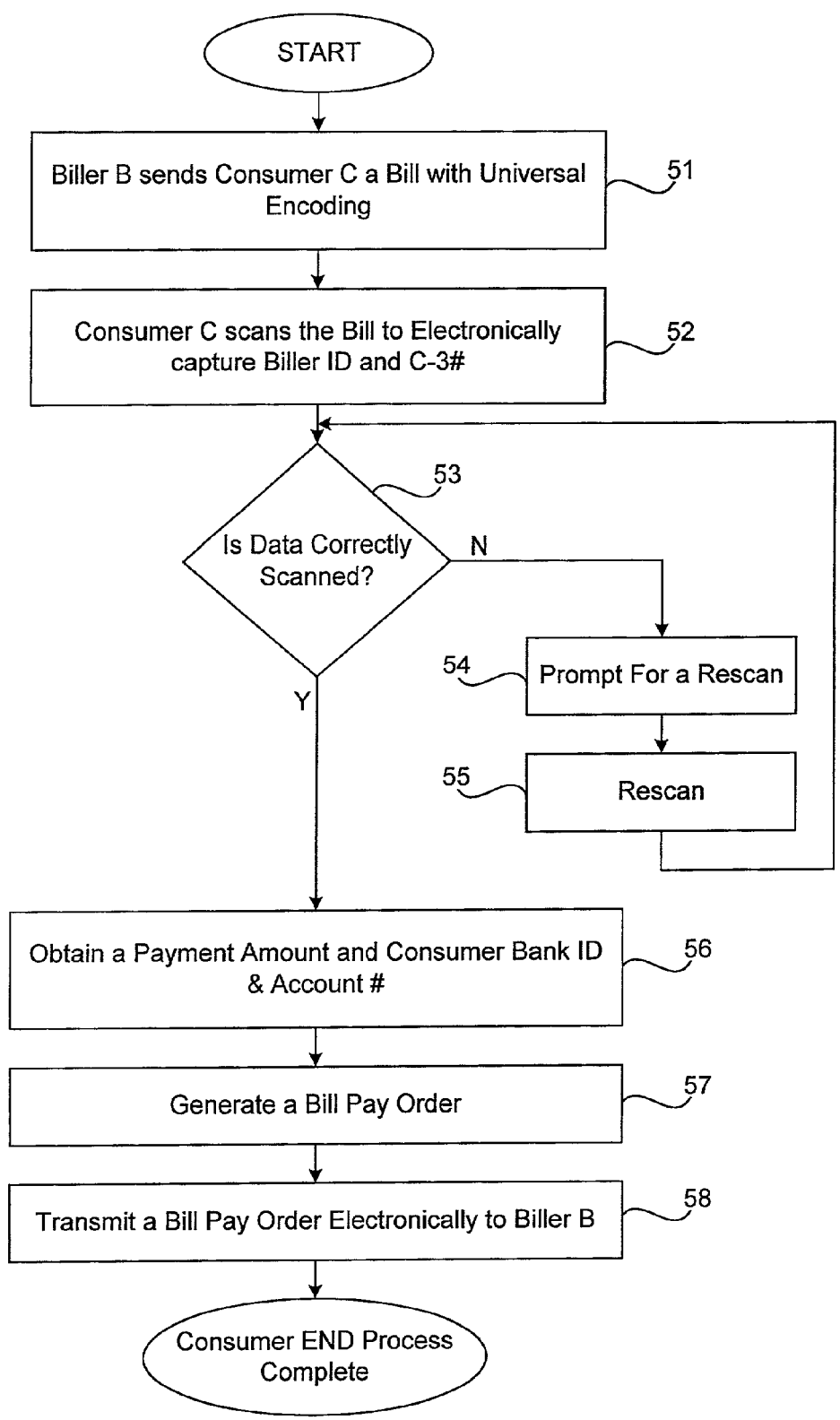
FIG. 5 is a flow chart of a bill payment process according to the present invention.

FIG. 4(c) shows an embodiment of a universal capture means provided by a smart card. FIG. 4(c) shows a smart card 408 which includes a capability to read universal encoding region 304 of bill 300. Smart card 408 is shown with a VISA logo 406, a liquid crystal display 410 and an array of electrical interface pins 412. To use smart card 408, Consumer C simply scans each of the bills to be paid and that information is stored internally to smart card 408. The information is downloaded from smart card 408 in a variety of ways. If the smart card is provided with other data entry means, such as an external key pad or a key pad built onto smart card 408, Consumer C can create the entire bill pay order using smart card 408. For example, Consumer C could scan a bill, enter a payment amount (if different from the amount due) and have a bill pay order generated within smart card 408. That bill pay order can then be transmitted to the payment network via electrical pins 412. Alternatively, smart card 408 is provided with an infra-red output. Electrical pins 412 might be adapted to connect to an RJ11 telephone adaptor simply a speaker output which emits DTMF tones, or a serial link to a personal computer as to a device (wallet) with a wireless modem.

Another application for smart card 408 is for use in combination with ATMs. In this application, a consumer scans a number of bills, takes smart card 408 to an ATM and inserts smart card 408 therein. Using the key pad of the ATM, the consumer enters any additional information, such as a source of funds, a payment amount other than the current amount due or an indication that the current amount due is equal to the payment amount, the payment date if different than the bill due date or an indication that the bill is to be paid on the due date, etc. This information is used by the ATM in combination with the data obtained by smart card 408 off the bills to generate properly validated bill pay orders. The ATM then transmits the bill pay orders to the payment network.

The flow chart of FIG. 5 will now be described. The blocks of the flow chart are labelled S1 through S8, and are followed in numerical order unless otherwise indicated.

The first step (step S1) is for biller B to send consumer C a bill encoded with the universal encoding. Because it is universal encoding, any consumer can read, capture and validate it without prior contact or arrangement with biller B. In a system where each biller is uniquely identified by a biller reference number (BRN), it would suffice to encode the BRN as the biller identification field. Where the BRN is not used, sufficient biller data to uniquely identify biller B is encoded, such as the biller name, address, telephone number, etc. Preferably, the BRN is used, since less encoding is required and an automatic match-up of the biller identification field with a biller in network 208 is more likely.

When consumer C receives the bill and is ready to pay it, consumer C scans the bill electronically to capture the biller ID field and the C-B account number field (step S2). This information is transmitted from the scanning device to a computer (typically an appropriately programmed microprocessor) for processing. This could either be a personal computer controlled by consumer C or a processor built into the reader. For example, the consumer terminal might be an integrated telephone with a display screen, alphanumeric entry keys, an internal microprocessor and a barcode wand or reader.

The captured information is validated (S3), and if found invalid, the consumer is prompted (S4) to rescan the bill, the bill is rescanned (S5) and then rechecked (S3). The data is validated at several levels. The first level is to detect whether the expected number of bits or characters were read. At a second level, the error-correction and detection data included in the universal encoding region is used to detect and correct, if necessary, reading errors. At a third level, the data is compared to previously collected data from an earlier bill and the data is validated using tables of valid biller ID's and C-B account number ranges obtained from payment network 208.

Next (S6), consumer C enters a payment amount, a payment date and an identification of the source of the funds. Of course, consumer C could rely on defaults, where the default payment amount is the scanned amount due, the payment date is the scanned due date and the source of funds is a preset bank account at a preset consumer bank. The preset information might be stored in the consumer's personal computer, screen telephone or smart card.

The information obtained in step S6 is used to generate an electronic bill pay order (S7), which is sent over payment network 208 in lieu of sending a paper check with the paper remittance stub to biller B. Once the bill pay order is electronically transmitted (S8) to payment network 208, payment network 208 handles all the other details of transferring the funds to biller B's account, sending A/R data 210 to biller B for credit to consumer C's account with biller B, etc.

The present invention has now been described. In summary, one application of the system is to electronically capture biller identification and C-B account number identification at a consumer end of an electronic bill payment system to ensure that bill pay orders are accurate without relying on correct data entry by the consumer. This is done without prior contact between the specific consumer paying the bill and the specific send of the bill.

The above description is illustrative and not restrictive. Many variations of the invention will become apparent to those of skill in the art upon review of this disclosure. For example, the bill sent to the consumer need not be in paper form, but could be electronic, such as via electronic mail. In this alternative embodiment, the universal encoding region would be represented by a standardized section of the bill from which the biller ID and C-B account number are capturable. The scope of the invention should, therefore, be determined not with reference to the above description, but instead should be determined with reference to the appended claims along with their full scope of equivalents.

What is claimed is:

1. An electronic bill pay system comprising:
   a biller;
   a consumer who electronically directs a consumer financial institution to electronically pay a bill provided by said biller;
   a bill pay network wherein said bill pay network facilitates an electronic transfer of funds from an account of said consumer at said consumer financial institution to an account of said biller;
   said bill received by said consumer from said biller, said bill having machine-readable data fields comprising a biller identifier field, a consumer-biller account number identifier field, an error correction field, and a detection data field;

data capture means for capturing said machine-readable data fields from said bill, said data capture means controlled by said consumer;

a consumer terminal receiving captured data fields from said data capture means;

a bill pay order generator for generating a bill pay order and electronically transmitting said bill pay order to said bill pay network;

a billing information table that contains valid biller identification numbers and consumer-biller account numbers obtained from said bill pay network;

a validation device configured to validate said captured data fields using said billing information table, said validation device also configured to detect and correct reading errors in said captured data fields using error correction and detection data and to detect whether said captured data fields contain an expected number of bits, wherein said consumer terminal is configured to prompt said consumer to recapture said machine-readable data fields if invalid data is detected;

a data receiving device configured to receive consumer entered data; and a table receiving device configured to receive said billing information tables from said bill pay network.

2. The electronic bill pay system of claim 1, wherein said bill is a printed bill and said machine-readable data fields comprise printed, optically readable data fields.

3. The electronic bill pay system of claim 2, wherein said optically readable data fields comprise printed bar codes.

4. The electronic bill pay system of claim 3, wherein said data capture means comprise a bar code reader.

5. The electronic bill pay system of claim 2, wherein said optically readable data fields comprise dot patterns.

6. The electronic bill pay system of claim 5, wherein said optically readable data fields comprise glyphs.

7. The electronic bill pay system of claim 1, wherein said bill is a printed bill and the machine-readable data fields comprise magnetically readable data fields.

8. The electronic bill pay system of claim 7 wherein said magnetically readable data fields comprise data magnetically encoded in a magnetic strip, and said data capture means comprise a magnetic strip reader.

9. The electronic bill pay system of claim 7 wherein said magnetically readable data fields comprise MICR encoded data printed on said bill.

10. The electronic bill pay system of claim 1, wherein said machine-readable data fields further comprise a due date indicator field and an amount due indicator field.

11. A method for electronically paying a bill comprising:

generating a bill having machine-readable data fields comprising a biller identifier field, a consumer-biller account number identifier field, an error correction field, and a detection data field;

sending said bill to a consumer from a biller;

capturing said machine-readable data fields from said bill, said capturing operation being performed by said consumer;

receiving a billing information table, which contains valid biller identification numbers and consumer-biller account numbers, from a bill pay network;

validating said captured machine-readable data fields using said billing information table;

detecting and correcting reading errors in said captured machine-readable data fields using error correction and detection data;

detecting whether said captured machine-readable data fields contain an expected number of bits;

prompting said consumer to recapture said machine-readable data fields when invalid data is detected;

receiving consumer entered data;

generating a bill pay order; and electronically transmitting said bill pay order to said bill pay network, whereby said bill pay order electronically directs a consumer financial institution to electronically pay said bill by causing an electronic transfer of funds from an account of said consumer at said consumer financial institution to an account of said biller.

12. A method as recited in claim 11, wherein said bill is a printed bill and said machine-readable data fields comprise printed, optically readable data fields, and wherein the capturing operation is performed optically.

13. A method as recited in claim 11, wherein said bill is a printed bill and the machine-readable data fields comprise magnetically readable data fields, wherein the capturing operation is performed magnetically.

14. An electronic bill pay system comprising:

means for electronically directing a consumer financial institution to electronically pay a bill provided by a biller, said bill having machine-readable data fields comprising a biller identifier field, a consumer-biller account number identifier field, an error correction field, and a detection data field;

a data capture device configured to capture said machine-readable data fields from said bill;

a consumer terminal receiving captured data fields from said data capture device;

a table receiving device configured to receive a billing information table, which contains valid biller identification numbers and consumer-biller account numbers;

a data receiving device configured to receive consumer entered data;

a validation device configured to validate said captured data fields using said billing information table, said validation device also configured to detect and correct reading errors in said captured data fields using error correction and detection data and to detect whether said captured data fields contain an expected number of bits, wherein said consumer terminal is configured to prompt said consumer to recapture said machine-readable data fields if invalid data is detected; and a bill pay order generator for generating a bill pay order.

15. The electronic bill pay system of claim 14, wherein said bill is a printed bill and said machine-readable data fields comprise printed, optically readable data fields.

16. The electronic bill pay system of claim 14, wherein said bill is a printed bill and the machine-readable data fields comprise magnetically readable data fields.

17. The electronic bill pay system of claim 14, wherein said machine-readable data fields further comprise a due date indicator field and an amount due indicator field.

18. A method for electronically paying a bill comprising:

receiving a bill, said bill having machine-readable data fields comprising a biller identifier field, a consumer-biller account number identifier field, an error correction field, and a detection data field, wherein the bill is received by a consumer;

capturing said machine-readable data fields from said bill, said capturing operation being performed by said consumer;

receiving a billing information table that contains valid biller identification numbers and consumer-biller account numbers;

validating said captured machine-readable data fields using said billing information table;

detecting and correcting reading errors in said captured machine-readable data fields using error correction and detection data;

detecting whether said captured machine-readable data fields contain an expected number of bits;

prompting said consumer to recapture said machine-readable data fields when invalid data is detected;

receiving consumer entered data; and generating a bill pay order, whereby said bill pay order is suitably used to electronically direct a consumer financial institution to electronically pay said bill by causing an electronic transfer of funds from an account of said consumer at said consumer financial institution to an account of said biller.

19. A method as recited in claim 18, wherein said bill is a printed bill and said machine-readable data fields comprise printed, optically readable data fields, and wherein the capturing operation is performed optically.

20. A method as recited in claim 18, wherein said bill is a printed bill and the machine-readable data fields comprise magnetically readable data fields, wherein the capturing operation is performed magnetically.

* * * * *

UNITED STATES PATENT AND TRADEMARK OFFICE
CERTIFICATE OF CORRECTION

| | |
|---|---|
| PATENT NO. | : 7,028,008 B2 |
| APPLICATION NO. | : 10/176449 |
| DATED | : April 11, 2006 |
| INVENTOR(S) | : William L. Powar |

It is certified that error appears in the above-identified patent and that said Letters Patent is hereby corrected as shown below:

In the Cover Page:

In page 2, in the "Other Publications" section, add --Wells Fargo Bill Payment Service, "Pay Your Bills With a Touch of a Button"--.

In page 2, in the "Other Publications" section, add --Steve A Money; OEEFAX/ ORACLE reception techniques, Part 1; Television; July 1975 pp. 396-398, Vol. 25.--

In page 2, in the "Other Publications" section, add --Edward J. Hogan; EFT Technology – Present and Future; Prepared statement to be delivered before the National Commission on Electronic Fund Transfers; December 16, 1975, pp. 148-205.--

In page 2, in the "Other Publications" section, right-hand column, change "Home Banlang Interchange; Revolving Credit Letter; May 27, 2983" to --Home Banking Interchange; Revolving Credit Letter; May 27, 2983.--

In page 2, in the "Other Publications" section, right-hand column, change "Home Banldng Interchange Offers More Than Just Credits and Debits; American Banker: Jul. 6, 1983 vol. 148.130" to --Home Banking I Interchange Offers More Than Just Credits and Debits; American Banker: Jul. 6, 1983 vol. 148.130.--

In the Specification:

Column 3, line 4, delete "an" before "barcode".

Signed and Sealed this

Fourth Day of September, 2007

JON W. DUDAS
*Director of the United States Patent and Trademark Office*